United States Patent [19]

Sutton, Jr.

[11] 4,447,388

[45] May 8, 1984

[54] BOLT FAILURE DETECTION

[75] Inventor: Harry G. Sutton, Jr., Pittsburgh, Pa.

[73] Assignee: The United States of America as represented by the United States Department of Energy, Washington, D.C.

[21] Appl. No.: 325,880

[22] Filed: Nov. 30, 1981

[51] Int. Cl.³ .............................................. G21C 17/00
[52] U.S. Cl. ..................................... 376/245; 376/250
[58] Field of Search .................... 376/245, 250; 73/40, 73/40.7

[56] References Cited

U.S. PATENT DOCUMENTS

| | | | |
|---|---|---|---|
| 1,052,392 | 2/1913 | Van Dyken | 116/214 |
| 1,778,643 | 10/1930 | Van Dyken | 4/532 |
| 2,399,864 | 5/1946 | Gilck | 73/40 |
| 3,147,190 | 9/1964 | Williams | 376/251 |
| 3,157,580 | 11/1964 | Williams | 376/253 |
| 3,196,531 | 7/1965 | Ripling | 29/407 |
| 3,664,922 | 5/1972 | Diwinsky et al. | 376/249 |
| 3,985,318 | 10/1976 | Dominey et al. | 73/49.3 |
| 4,033,813 | 7/1977 | Holt et al. | 376/250 |
| 4,259,152 | 3/1981 | Pennell et al. | 376/250 |

OTHER PUBLICATIONS

Nuc. Tech., vol. 26, (8/75), pp. 472–479, Strand et al.

Primary Examiner—Sal Cangialosi

[57] ABSTRACT

Bolts of a liquid metal fast breeder reactor, each bolt provided with an internal chamber filled with a specific, unique radioactive tag gas. Detection of the tag gas is indicative of a crack in an identifiable bolt.

4 Claims, 3 Drawing Figures

BOLT FAILURE DETECTION

GOVERNMENT CONTRACT

This invention was conceived in the course of a contract with the United States Government identified as Contract No. DE-AC-15-76-C-2395.

BACKGROUND OF THE INVENTION

1. Field of the Invention

This invention relates to fastening apparatus particularly useful in nuclear reactor systems, and pressurized power systems.

2. Description of the Prior Art

In order to ensure reliability of any structural system including bolt-fastened components, especially components of a nuclear reactor, it is common practice for the bolts to be periodically inspected for evidence of crack initiation or other failure. These bolts are often inaccessible due to radiation and/or position.

It is desired to provide accurate, rapid and remote indication of bolt failure particularly for nuclear reactors.

SUMMARY OF THE INVENTION

A chamber or chambers is to be incorporated into the body of a bolt and the chamber filled with a tag gas. In the event that a crack occurs in the bolt which traverses the space between the chamber and its outside surface, the gas will be released. A gas detection system is provided in a location to which the gas will be transported by natural or forced circulation. This gas detection system will detect and identify the tag gas escaping from the cracked bolt. The detection system can be set up to operate continuously or to be turned on by a trigger gas which also would be enclosed in the bolt chamber. One or more chambers may be provided. The chamber may be coincident with the center line of the bolt where it would have a minimal effect on the strength of the bolt. Additional connected or separate chambers could be provided in the bolt.

Each bolt in a circle or group of bolts can have a different tag gas to identify the cracked bolts. Also, each chamber in a multi-chambered bolt can have a different tag gas to localize the failure within the bolt.

DESCRIPTION OF THE PREFERRED EMBODIMENT

The invention is a bolt with an internal chamber or chambers filled with a tag gas, and sealed such as with a seal-welded plug. The tag gas and pressure are selected relative to the chamber size to provide sufficient tag gas, and/or trigger gas for detection.

A tag gas is defined herein as a gas or a blend of gases of a chemical and nuclear species which emits radiation of a known energy and variety. A trigger gas is defined herein as a tag gas which is chosen to activate a system or sequence of events upon detection in a certain location by a monitor. For example, a trigger gas could be chosen to trigger a building isolation and alarm system.

The technology of tag gases is discussed in an article entitled "Design and Manufacture of Gas Tags for FFTF Fuel and Control Assemblies":, *Nuclear Technology*, Vol. 26, August 1975, incorporated herein by reference.

Figure 1:
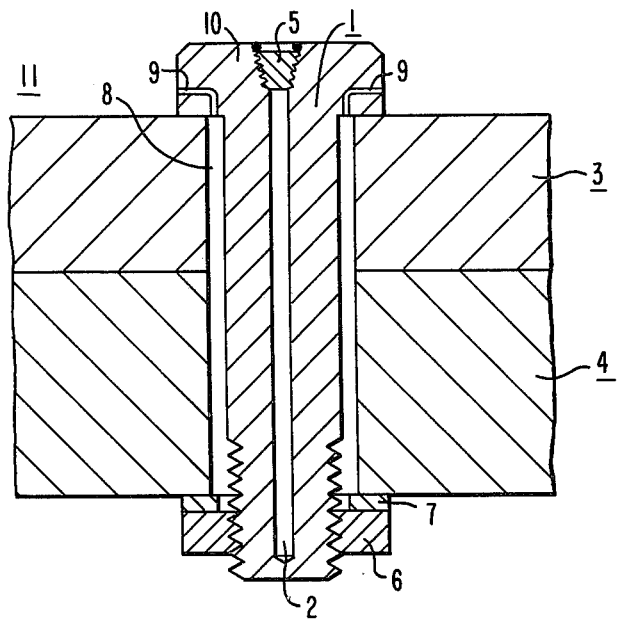
FIG. 1 is a schematic profile of a bolt.

Refer to FIG. 1 which illustrates a bolt 1 having a single chamber 2 filled with tag gas. Bolt 1 is shown securing together components 3 and 4. Nut 6 and washer 7 attach to bolt 1 at the lower end. The tag gas is contained within chamber 2 having been introduced there via an entry sealed by welded plug 5.

Chamber 2 is located along the center line of bolt 1 to reduce strength reduction. A crank along the section of bolt 1 within components 3 and 4 which crack extends between chamber 2 and volume 8, will allow the tag gas to enter volume 8. Because the nut 6 and washer 7 may at least a partial seal, and bolt head 10 may do the same, a passage 19 may be incorporated in the bolt head 10 to allow unhindered passage of the tag gas to the external volume 11 which is monitored for the presence of the tag gas, such presence there indicative of the crack.

Figure 2:
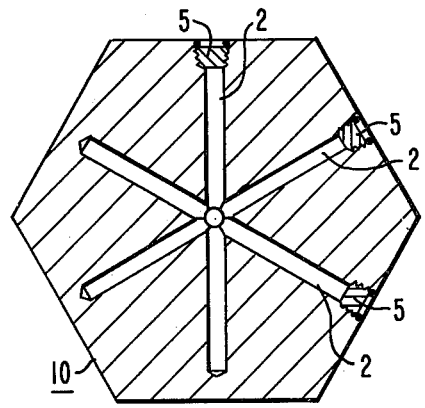
FIG. 2 is a schematic plan view of a bolt.

Refer to FIG. 2 which illustrates an embodiment wherein a plurality of chambers 2 is provided within a bolt head 10. These chambers 2 need not intercommunicate if it is desired to locate different tag gases within each such that the location of the crack within the bolt is to be detectable. Otherwise all chambers may communicate such that only one plug 5 would be required.

Figure 3:
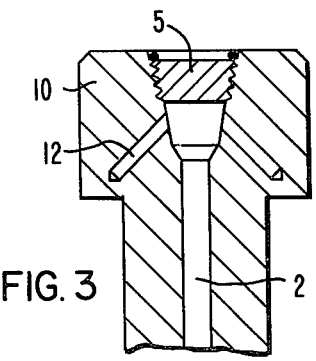
FIG. 3 is a schematic profile of a bolt head.

Refer to FIG. 3 which illustrates the use of a plurality of blind holes 12 to form chambers 2 within the bolt head 10.

This invention could be applied to the rods, studs or other structural members with similar benefits as when applied to bolts.

An application of especial interest are the guard vessel hold down bolts of a liquid metal reactor since these bolts are inaccessible.

While in the drawings and in the specification, a general device has been disclosed, modifications may be made to this device without departure from the true spirit and scope of the invention. Therefore, this specification should be considered illustrative rather than limiting.

I claim:

1. A bolt member for use in normally inaccessible parts of nuclear reactors which makes a normal inspection for cracks in the bolt member impractical, said bolt member having an enlarged head portion and a cylindrical body portion having a threaded lower end onto which a nut member is adapted to be screwed to retain nuclear reactor components in operative relationship, said bolt member having a bolt-crack indicator comprising:

an elongated chamber provided within said bolt member, said elongated chamber during fabrication of said bolt-crack indicator having an entry portion opening from an exposed surface of the enlarged head portion of said bolt member, tag gas having been introduced into said elongated chamber through the entry portion thereof during fabrication of said bolt-crack indicator, and a plug sealing the entry portion of said elongated chamber and sealing said tag gas within said elongated chamber, whereby a developed crack in said bolt member which permits tag gas within said chamber to escape to the environment outside said bolt member provides evidence of such crack in said bolt member.

2. A bolt member for use in normally inaccessible parts of nuclear reactors which makes a normal inspection for cracks in the bolt member impractical, said bolt member having an enlarged head portion and a cylindrical body portion having a threaded lower end onto which a nut member is adapted to be screwed to retain nuclear reactor components in operative relationship, said bolt member having a bolt-crack indicator comprising:

an elongated chamber centrally provided along the axis of the cylindrical body portion of said bolt member and into the enlarged head portion of said bolt member, said elongated chamber during fabrication of said bolt-crack indicator having an entry portion opening from an exposed surface of the enlarged head portion of said bolt member, tag gas having been introduced into said elongated chamber through the entry portion thereof during fabrication of said bolt-crack indicator, and a plug sealing the entry portion of said elongated chamber and sealing said tag gas within said elongated chamber, whereby a developed crack in said bolt member which permits tag gas within said chamber to escape to the environment outside said bolt member provides evidence of such crack in said bolt member.

3. The bolt member as specified in claim 2, wherein an additional aperture is provided through the enlarged head portion of said bolt member, and said additional aperture connects a lower surface of the enlarged head portion proximate the cylindrical body portion of said bolt member to an upper surface of the enlarged head portion of said bolt member to permit passage of gas therethrough, whereby release of tag gas through the cylindrical body portion of said bolt member has ready access through said additional aperture to the environment outside said bolt member.

4. A bolt member for use in normally inaccessible parts of nuclear reactors which makes a normal inspection for cracks in the bolt member impractical, said bolt member having an enlarged head portion and a cylindrical body portion having a threaded lower end onto which a nut member is adapted to be screwed to retain nuclear reactor components in operative relationship, said bolt member having a bolt-crack indicator comprising:

a plurality of elongated chambers laterally disposed within the enlarged head portion of said bolt member, said elongated chambers during fabrication of said bolt-crack indicator each having an entry portion opening from an exposed surface of said enlarged head portion, tag gas having been introduced into said elongated chambers during fabrication of said bolt-crack indicator, and plugs sealing the entry portions of each of said elongated chambers and sealing said tag gas within said elongated chambers, whereby a developed crack in said bolt member which permits tag gas within any of said chambers to escape to the environment outside said bolt member provides evidence of such crack in said bolt member.

* * * * *